Patented May 9, 1944

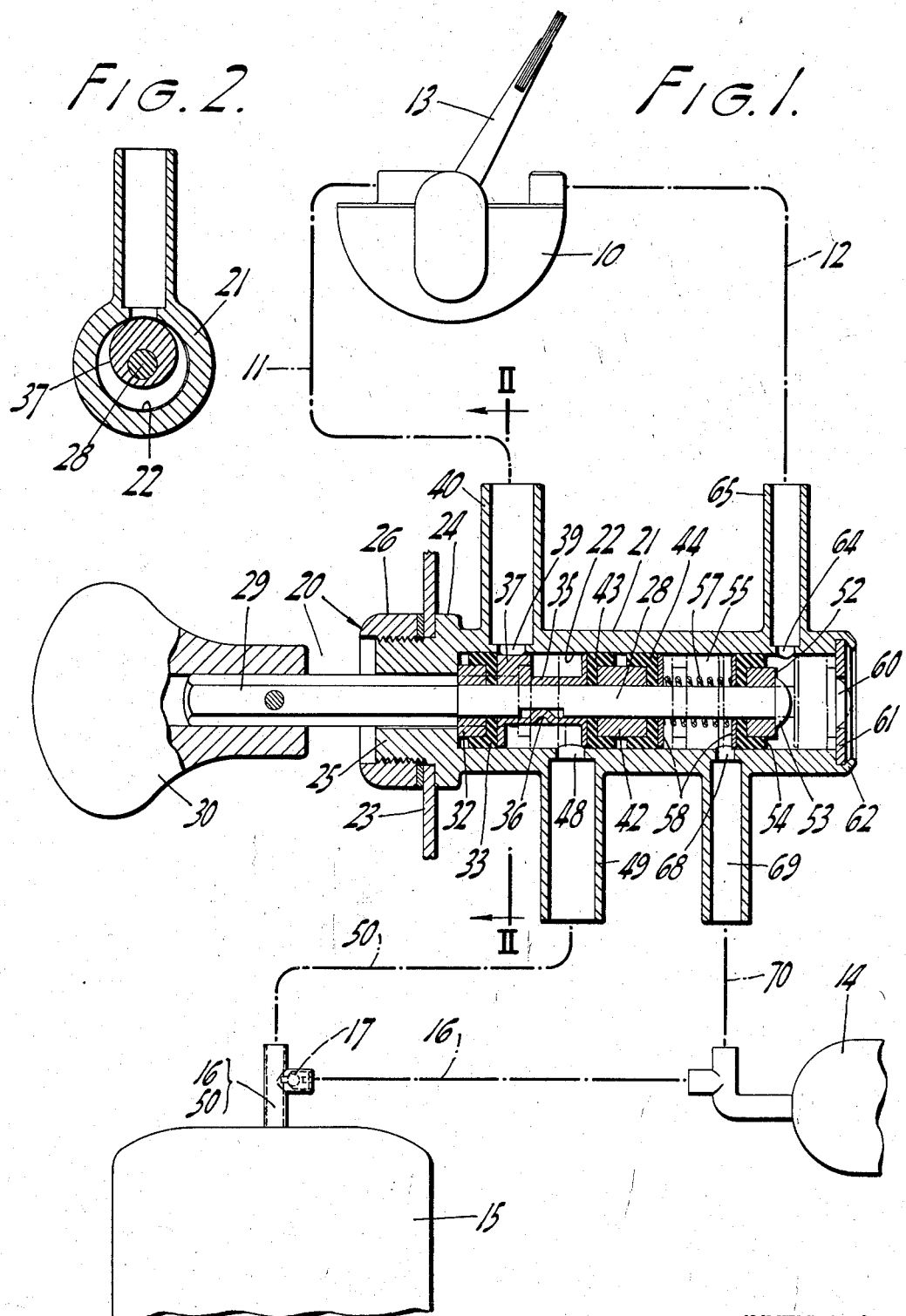

2,348,346

UNITED STATES PATENT OFFICE 2,348,346

WINDSHIELD CLEANER SYSTEM

Erwin C. Horton, Hamburg, and Anton Rappl, Buffalo, N. Y., assignors to Trico Products Corporation, Buffalo, N. Y.

Application January 1, 1942, Serial No. 425,362

3 Claims. (Cl. 60—60)

This invention relates to a fluid pressure vehicle accessory system and more particularly to novel control means therefor.

In the operation of fluid pressure systems generally, it is desirable to provide a reserve supply of pressure fluid, particularly where the primary fluid pressure source is variable in its output. While the principles of the present invention are general in their application in this field, a particular accessory system embodying the underlying principles of the present invention is set forth herein by way of example. However, while particular reference is had throughout the ensuing specification to a fluid pressure windshield cleaner system actuated from a source of sub-atmospheric pressure, it is to be understood that analogous pressure operated accessories may be substituted and positive pressure sources may be employed without departing from the principles and teachings of the invention. Nothing herein is to be construed as limiting the spirit or scope of the invention excepting as it is defined in the appended claims.

Referring to the disclosed example of the application of the principles of the present invention, vacuum operated automatic windshield cleaners for vehicles are widely used and conventionally include operating motors arranged for two conditions of fluid pressure application; one wherein the pressure is so applied as to oscillate or otherwise move the clearing means substantially continuously on a windshield surface; and another wherein the pressure is so applied as to continuously hold the cleaning means in a predetermined arrested position, the latter being generally referred to as a "parked" condition of the windshield cleaner and prevailing whenever the cleaner is not being used and differential fluid pressure is available.

It is desirable, particularly where the source of differential pressure is variable in output, to employ a storage vessel, either interposed in the fluid conduit between the pressure generating source and the accessory motor or associated in the system in such other manner as to be jointly available with the primary pressure source. A disadvantage of prior systems of this general nature has resided in the fact that application of parking and holding pressure to the accessory in an entirely leak-proof manner has not been commercially possible. As a result the stored fluid pressure becomes dissipated during periods when the primary pressure generator is inactive or relatively so. It is desired that the pressure differential built up be retained for useful work, among other things to insure quick starting of the windshield cleaner when its manual control is actuated to begin cleaning.

By virtue of the system of the present invention the stated disadvantage is entirely eliminated since the fluid differential pressure of the storage vessel, while conveniently available for use during periods of windshield cleaner or accessory operation, is closed off from the accessory when the accessory is stopped.

It is an object of the invention to attain the desired fluid pressure relationship automatically and with no requirement for special attention of the operator. A further object of the invention resides in accomplishing the desired cut-off between the storage vessel and the accessory while at the same time retaining fluid communication between the primary fluid pressure source and the storage vessel to the extent that the latter may be replenished by the former whenever the former is developing fluid differential pressure greater in degree than that already present in the vessel. It is further contemplated that other accessories may be operated from the fluid pressure supply of the system.

Other objects and advantages attendant upon use of the teachings of the instant invention will appear to those skilled in the art from a perusal of this specification in connection with the accompanying drawing, wherein:

Fig. 1 is a somewhat diagrammatic view of an entire windshield cleaner system comprising one form of the present invention and showing the control element thereof in longitudinal cross section; and Fig. 2 is a cross sectional view taken approximately on line 2—2 of Fig. 1.

Throughout the several figures of the drawing like characters of reference denote like parts and the numeral 10 designates a windshield wiper motor connectible with a pair of fluid conduits 11 and 12, the former being connected with the motor in such manner as to cause the motor to oscillate an associated windshield wiper arm 13, and the latter being connectible with the motor to move the arm 13 to parked position and hold the same in such position.

When it is desired to construct a windshield wiper motor of the instant type, that is, one wherein only two selectively connectible fluid conduits lead from the manual control means to the motor, it has heretofore been necessary to provide special means to insure parking in spite of the particular position which the conventional automatic reversing valve may chance to assume at the instant when the manual control is moved from operating to parked position. Such means usually comprise special apparatus for automatically venting one side of the windshield cleaner motor upon application of parking pressure to the opposite side thereof, and a fully operative example of such a motor is found in the copending application for Letters Patent of one of the present applicants, Anton Rappl, filed May 31, 1940, Serial No. 337,966. The motor 10 of the present application may be of the type set forth fully in the above mentioned application for Letters Patent, or any other type designed to selectively operate or park, according to which of a pair of fluid conduits is energized.

Referring to Fig. 1, the source of fluid differential pressure in the present instance comprises an intake manifold 14 of an internal combustion engine (not shown) in which manifold the fluid pressure is sub-atmospheric during periods of normal engine operation. A sub-atmospheric pressure storage chamber or vacuum reservoir is designated 15 and a conduit 16 connects between the manifold 14 and the reservoir 15, there being provided a unidirectional check valve 17 which permits fluid flow from the reservoir to the manifold 14, to tend to evacuate the former, but which prevents retrograde fluid flow.

The manual control means of the present system is designated generally 20 in Fig. 1 and may comprise a generally cylindrical body 21 having an axial bore 22. The body 21 may be supported by the instrument panel of a vehicle as at 23, and such support may be effected by providing an annular flange 24 on the body 21 and a threaded end portion 25 for projection through a suitable opening in the instrument panel and engagement with a retaining nut 26.

A plurality of annular valving elements are disposed within the bore 22 of the body member 21 and are all retained for joint axial movement by a stem 28 in a manner which will presently appear. The stem 28 extends from the body member 21 and is preferably non-circular at its terminal extending portion as at 29, whereby a suitable manipulating knob 30 may be secured thereto and rendered readily non-rotatable with respect to the stem 28.

Adjacent the enlarged non-circular portion 29, the stem 28 is provided with an annulus 32 which supports a cup-like packing 33 which prevents fluid flow between the interior of the bore 22 and the atmosphere through the left-hand end of the bore. To the right of the packing 33 the stem 28 receives a sleeve-like element 35 which is secured against rotation with respect to the stem 28 by means of a protuberance 36 which engages a flattened portion of stem 28. As will be seen from the detailed cross section, Fig. 2, the sleeve-like element 35 has formed thereon an eccentric sheave 37 which, upon joint rotation of the stem 28 and the sleeve-like element 35, varies the degree of communication between the interior of the bore 22 and a passage 39 formed in the wall of the body 21. The passage 39 communicates with a nipple 40 formed on the body 21, the nipple 40 being connectible with the operating conduit 11 of the windshield wiper motor.

A second annulus 42 is associated with the stem 28 to the right of the sleeve-like element 35 and has cup-like packings 43 and 44 disposed over its opposite ends. The packings 33 and 43 accordingly define a fluid passage in the bore 22 which, when the control stem 28 is in the illustrated position, establishes a fluid communication system between the passage 39 and a second passage 48 formed in the wall of the body member 21 and spaced axially with respect to the passage 39. The axial spacing of the passages 39 and 48 is provided so that, when the control stem 28 is moved to its opposite or "off" position, the passage 39 is vented to the atmosphere (this condition being an incident to successful operation of the motor shown in the prior application referred to above) while the passage 48 is sealed by the packing 33.

The passage 48 communicates with a nipple 49 which is connectible with a conduit 50 extending to and in free and open communication with the reservoir 15. From the foregoing it will be seen that with the stem 28 and the control knob 30 thereof in the position shown in Fig. 1, the fluid pressure differential of the reservoir 15 is connected with the operating conduit 11 of the motor 10 through the conduit 50, the nipple 49, the passage 48, the portion of the bore 22 between the packings 33 and 43, the passage 39 and the nipple 40. It will further be seen that the effective cross sectional area of this fluid communication may be controlled by rotation of the eccentric 37 which is fixed for rotation with the control stem 28 and the knob 30.

Whenever the fluid differential pressure in the intake manifold 14 exceeds in degree that present in the reservoir 15, the check valve 17 will be opened and fluid may move directly from the conduit 50 into the conduit 16 and the intake manifold 14. Under this condition the reservoir 15 serves principally to supplant temporary deficiencies of pressure of the intake manifold 14 and serves to make uniform a pressure supply which might otherwise vary to an extent sufficient to produce variation in the speed of operation of the cleaner or even temporary stoppage thereof.

At its right-hand end as viewed in Fig. 1 the control stem 28 is provided with an annulus 52 which may be held on the end of the stem 28 by forming a rivet head 53 at the end of the stem. A cup leather packing 54 is associated with the annulus 52 at its left-hand face, as seen in Fig. 1, and an axially extending space 55 is maintained between the packing 44 and the packing 54 by means of a compression spring 57 which acts between those packings. If desired, washers or collars 58 may be interposed between the respective ends of the spring 57 and the packings 44 and 54.

When the parts are in the position illustrated, that is, when the windshield cleaner is in operation, the right-hand end of the bore 22 is vented by means of a passage 60 formed in an end washer 61 which is disposed over the right-hand end of the bore 22, in the illustrated instance by counterboring the body member 21 to receive the washer 61 and subsequently riveting over the end of the body member 21 as at 62. This vented condition of the right-hand end of the bore 22 is communicated to the parking conduit 12 by means of a passage 64 formed in the wall of the body member 21 and communicating with a nipple 65 which connects with the conduit 12.

When the control knob 30 and consequently the stem 28 and the several packing elements carried thereby are moved to their extreme right-hand position, as indicated in dot-and-dash lines in Fig. 1, the packing 33 severs the fluid connection between the passages 39 and 48 and, by reason of the space 55 between the packings 44 and 54, connects the passage 64 with a fluid passage 68 which communicates with a nipple 69 and a conduit 70 leading directly to the intake manifold 14.

With connection between the conduits 70 and 12 thus established, the reservoir 15 will be shut out of the windshield cleaner system so far as the conduit 50 is concerned and its only connection in the system will be through the check valve 17 of the conduit 16. Accordingly, with the windshield wiper in parked position, the only change in condition which can be effected with respect to the reservoir 15 is a further evacuation thereof by operation of the intake manifold 14 whenever the fluid differential in the latter exceeds that in the reservoir excepting for whatever drains are made on the reservoir pressure by other accessories, if such be present. Dissipation of the pressure stored in the reservoir by reason of leakage in the windshield cleaner system, particularly the parking valve, is accordingly effectively eliminated, while parking and holding of the windshield wiper in desired parked position during all periods of operation of the vehicle engine is satisfactorily effected by virtue of the connection established between the conduits 70 and 12.

What is claimed is:

1. A motor vehicle windshield wiper system comprising a sub-atmospheric fluid pressure generator, a vacuum reservoir, a vacuum operated windshield cleaner motor having a fluid wiper operating passage and a fluid wiper parking and arresting passage, a conduit between said fluid pressure generator and said arresting passage and a conduit between said reservoir and said operating passage, valve means for rendering said two conduits selectively effective to alternatively connect either of said passages with its source of fluid pressure, a conduit between said generator and said reservoir, and a check valve in said conduit permitting fluid flow from said reservoir to said generator but preventing retrograde fluid flow, whereby said wiper is parked directly from the generator alone and depletion of the vacuum supply of the reservoir during periods when the wiper is arrested is avoided.

2. A motor vehicle accessory system comprising an internal combustion engine having an intake manifold, a vacuum reservoir, a vacuum actuated accessory having a fluid operating passage and a fluid arresting passage, a conduit between said manifold and said arresting passage and a conduit between said reservoir and said operating passage, valve means for rendering said two conduits selectively effective to alternatively connect either of said passages with its source of fluid pressure, a conduit between said manifold and said reservoir, and a check valve in said conduit permitting free fluid flow from said reservoir to said manifold but preventing retrograde fluid flow.

3. A motor vehicle windshield wiper system comprising an internal combustion engine having an intake manifold, a vacuum reservoir, a vacuum operated windshield cleaner motor having a fluid wiper operating passage and a fluid wiper parking and arresting passage, a conduit between said manifold and said arresting passage and a conduit between said reservoir and said operating passage, valve means for rendering said two conduits selectively effective to alternatively connect either of said passages with its source of fluid pressure, a conduit between said manifold and said reservoir, and a check valve in said conduit permitting fluid flow from said reservoir to said manifold but preventing retrograde fluid flow, whereby said wiper is parked directly from the manifold alone and depletion of the vacuum supply of the reservoir during periods when the wiper is arrested is avoided.

ERWIN C. HORTON.
ANTON RAPPL.